United States Patent [19]
Harder, Jr.

[11] 3,848,937
[45] Nov. 19, 1974

[54] SLIDE MECHANISM

[75] Inventor: Arthur J. Harder, Jr., Franklin Park, Ill.

[73] Assignee: Coach and Car Equipment Corporation, Elk Grove Village, Ill.

[22] Filed: Apr. 26, 1972

[21] Appl. No.: 247,681

[52] U.S. Cl............................ 308/6 R, 312/341 NR
[51] Int. Cl. ............................................ F16c 21/00
[58] Field of Search....... 308/6 R, 3.6; 312/341 NR, 312/346, 347, 343, 344, 332

[56] References Cited
UNITED STATES PATENTS

| | | | |
|---|---|---|---|
| 873,914 | 12/1907 | Vikoren | 312/332 |
| 2,759,773 | 8/1956 | Wilmer | 308/3.6 |
| 3,126,230 | 3/1964 | Spicer | 308/3.6 |
| 3,351,406 | 11/1967 | Ropiequet | 308/3.6 |
| 3,445,143 | 5/1969 | Swenson | 308/3.6 |
| 3,649,090 | 5/1972 | Dutot | 308/3.6 |
| 3,679,274 | 7/1972 | Nance | 308/3.6 |

Primary Examiner—Manuel A. Antonakas
Assistant Examiner—R. H. Lazarus
Attorney, Agent, or Firm—Merriam, Marshall, Shapiro & Klose

[57] ABSTRACT

A slide mechanism comprising a slidable frame slidably movable relative to a stationary frame. Pairs of opposed, spaced apart bearing elements are mounted on the stationary frame, and each bearing element in a pair slidably engages a respective one of a pair of slide rails on the slidable frame. Each bearing element is composed of self-lubricating, corrosion-resistant plastic material. Each bearing element has sufficient resiliency to flex between a normal condition in which the bearing element is relatively bowed toward the opposed bearing element and a less bowed condition. The bearing element is mounted, and engages its slide rail, in the less bowed condition. The natural resiliency of the bearing element urges it to return to its normal, more bowed condition; and this causes the slidable frame to be gripped between the opposed bearing elements and held against movement transverse to the direction of sliding movement.

11 Claims, 8 Drawing Figures

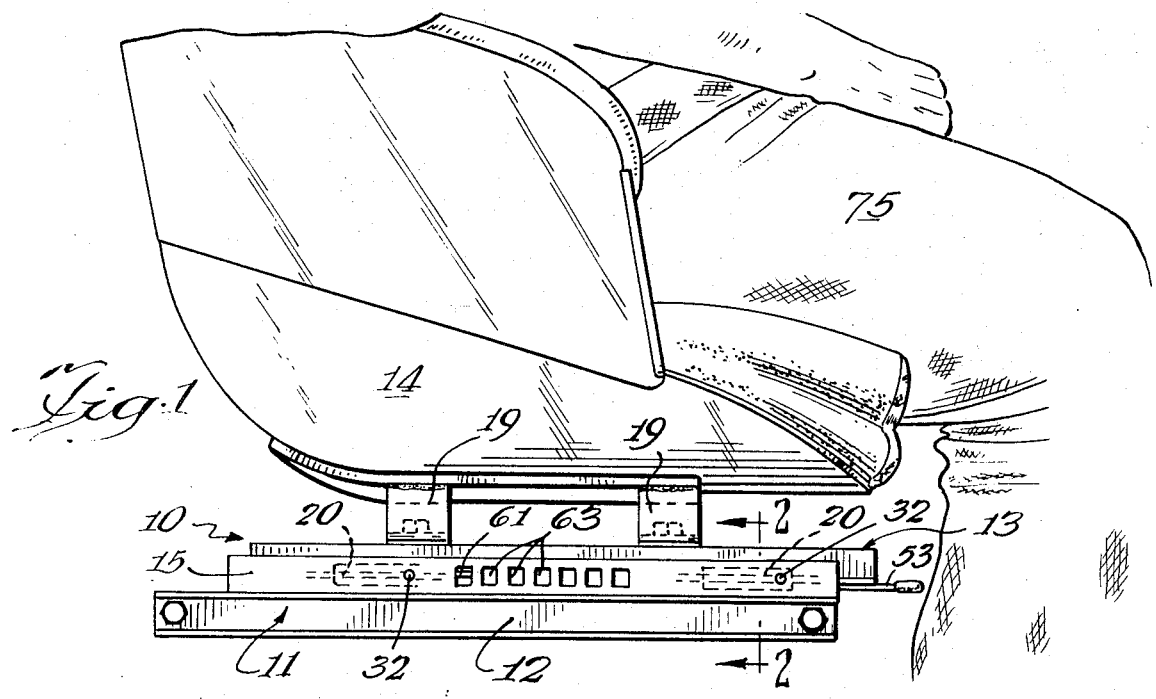
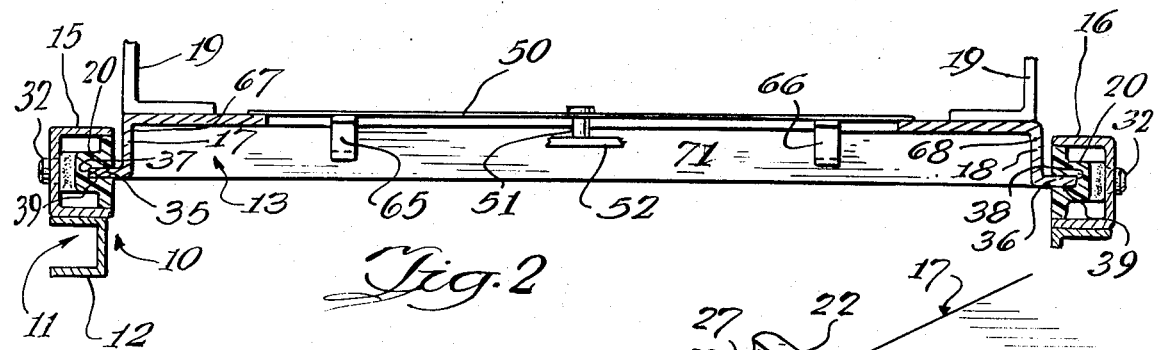
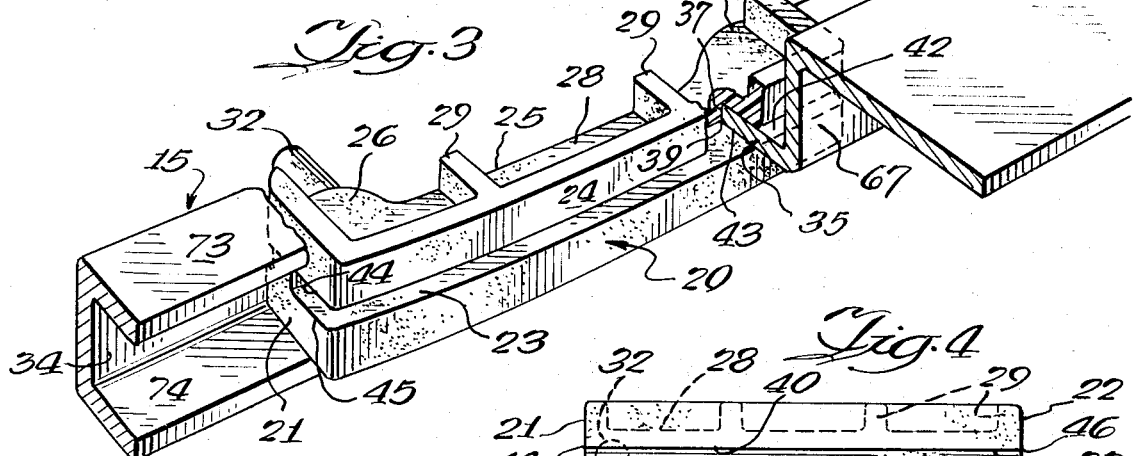
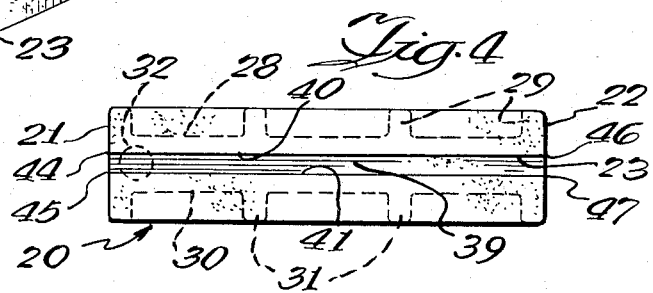

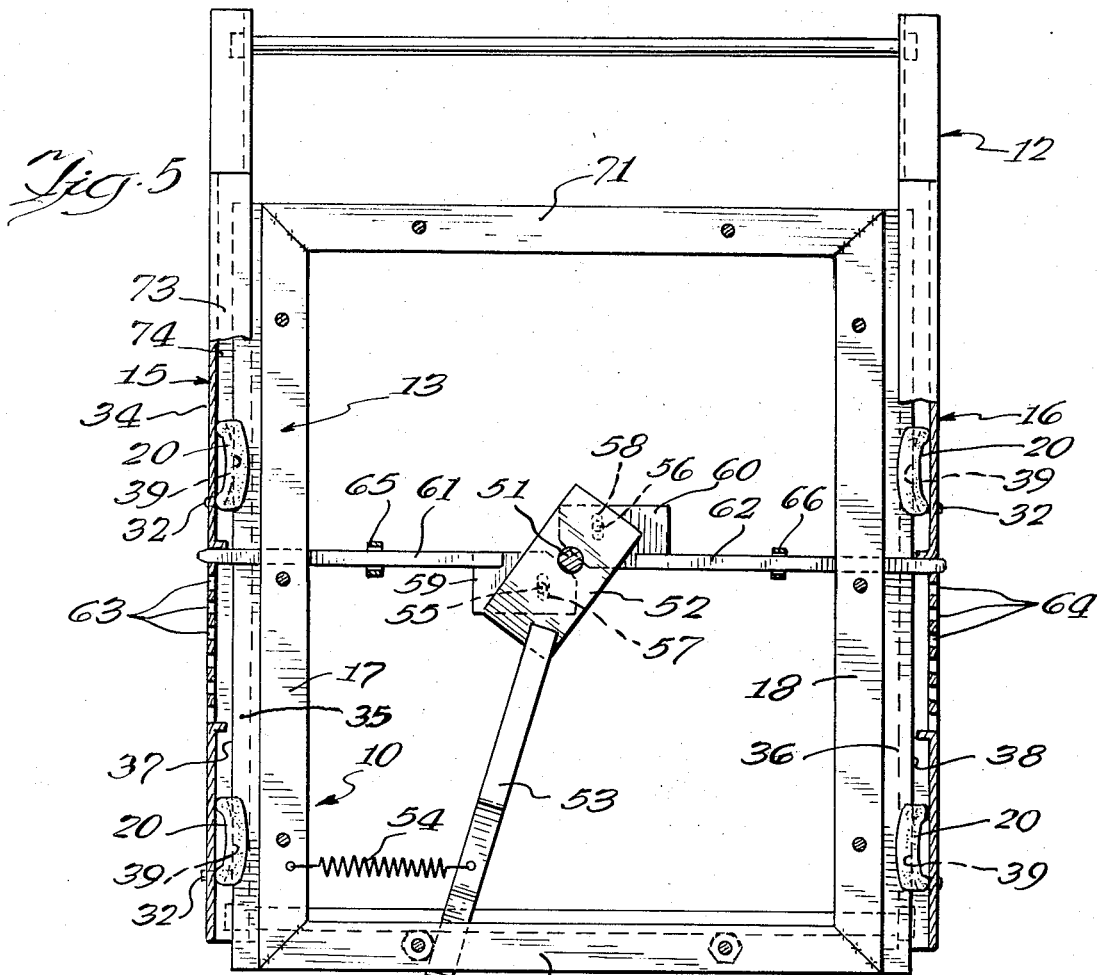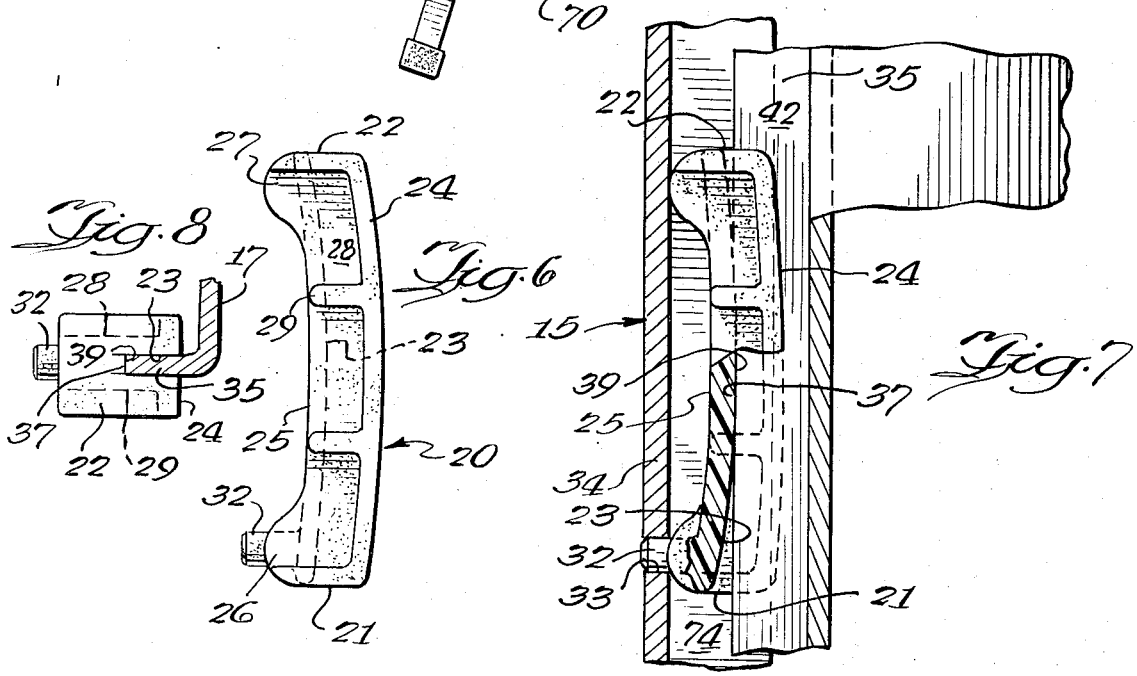

SLIDE MECHANISM

BACKGROUND OF THE INVENTION

The present invention relates generally to a slide mechanism in which one frame is slidable relative to another frame which remains stationary relative to the slidable frame, and more particularly to a slide mechanism having structure for preventing movement of the slidable frame relative to the stationary frame in a direction transverse to the direction of sliding movement.

Slide mechanisms of the type described above are used, for example, to mount vehicle seats for frontward and rearward sliding movement relative to a base on which the seat is mounted, to adjust the distance between the seat and the steering wheel of the vehicle. Such adjustable vehicle seats are often employed in off-the-road vehicles, such as tractors and construction equipment, where the slide mechanism is subjected to dirt and moisture, causing jamming problems in the sliding mechanism. Jamming can be due to dirt or dust being windblown into the sliding mechanism or to corrosion of the parts of the sliding mechanism.

It is desirable to prevent movement of the sliding vehicle seat from side to side in a direction transverse to the direction of sliding movement. Conventionally, this has required close tolerances for the engaging parts of the slide mechanism, and this is not only expensive but also it has a tendency to increase the likelihood of jamming.

Some slide mechanisms comprise a base or stationary frame on which are mounted anti-friction bearings composed of a non-corrosive, self-lubricating, anti-friction plastic material such as nylon. These bearings slidably engage rails connected to the slidable frame or vechicle seat. Such bearings have less tendency to jam, but they still retain the problem of side to side movement of the slidable seat relative to the base unless the bearings and slide rails have close tolerances.

SUMMARY OF THE INVENTION

The present invention relates to a slide mechanism which includes all of the corrosion-resistant, anti-jamming advantages of prior slide mechanisms while, at the same time, eliminating the problem of side to side movement of the slidable seat relative to the stationary base, without requiring close tolerances between the bearings and their slidably engaged rails.

The present invention utilizes a bearing element composed of non-corrosive, self-lubricating, anti-friction plastic material such as nylon, polytetrafluoroethylene, high density polyethylene or the like. Pairs of these bearing elements are mounted on the stationary frame, with each member of a pair being spaced apart from the other member in a direction transverse to the direction of desired sliding movement and in opposed relation to the other bearing element.

The bearing element is precast in a curved or bowed configuration; and the bearing element is composed of material having sufficient resiliency to permit flexing between a normal condition in which the bearing element is relatively bowed toward the other bearing element in the pair and a condition in which the bearing element is relatively less bowed. The bearing element is mounted on the stationary frame in the relatively less bowed condition and engages a respective slide rail on the slidable frame in this relatively less bowed condition.

The natural resiliency of the bearing element urges it to return to its normal, more bowed condition. This causes the bearing element to push against its engaged slide rail, urging the latter toward the opposed bearing element; and the opposed bearing element is doing the same thing relative to its engaged slide rail. The net result is for the two opposed bearing elements to grip the slidable frame therebetween, thereby preventing movement in a direction transverse to the direction of sliding movement, while still permitting sliding movement.

Other features and advantages are inherent in the structure claimed and disclosed or will become apparent to those skilled in the art from the following detailed description in conjunction with the accompanying diagrammatic drawing.

BRIEF DESCRIPTION OF THE DRAWING

FIG. 1 is a side elevational view of an embodiment of slide mechanism in accordance with the present invention;

FIG. 2 is a sectional view along line 2—2 of FIG. 1, with some parts removed;

FIG. 3 is an enlarged fragmentary perspective illustrating a bearing element in engagement with a slide rail;

FIG. 4 is a side elevational view of the bearing element;

FIG. 5 is a plan view, partially cut away, of the slide mechanism;

FIG. 6 is a plan view of the bearing element in its normal, relatively bowed condition;

FIG. 7 is a fragmentary sectional view illustrating the bearing element mounted on the stationary frame and engaging a slide rail with the bearing element in a relatively less bowed condition; and FIG. 8 is an end view of the bearing element and slide rail.

DETAILED DESCRIPTION INCLUDING A PREFERRED EMBODIMENT

Referring initially to FIGS. 1, 2 and 5, indicated generally at 10 is an embodiment of a slide mechanism constructed in accordance with the present invention. Slide mechanism 10 includes a first or stationary frame 11 having a lower base portion 12 and a pair of channel-shaped members 15, 16 each mounted atop base portion 12 in spaced apart relation.

A seat 14 is supported by brackets 19 atop a second or slidable frame 13 mounted for frontward and rearward slidable movement relative to stationary frame 11 (to the right and left as viewed in FIG. 1).

Parts of the legs 75 of a seat occupant are shown in FIG. 1.

Located on stationary frame 11, within channel-shaped members 15, 16, are pairs of bearing elements 20, 20, two pairs being shown in FIG. 5. Each bearing element in a pair is disposed in opposed relation to the other bearing element in the pair and the two are spaced apart in a direction transverse to the direction of sliding movement. Slidable frame 13 has a pair of transversely spaced sliding rail elements 17, 18 each slidably engaging a respective one of a pair of bearing elements 20, 20 to mount slidable frame 13 and seat 14 for slidable movement relative to stationary frame 11.

Front and rear members 70, 71 complete slidable frame 11.

Each bearing element 20 is composed of a corrosion-resistant, sel-lubricating, anti-friction plastic material such as nylon, polytetrafluoroethylene, high density polyethylene or the like and is cast in the shape shown in FIGS. 4 and 6. Bearing element 20 is elongated in the direction of sliding movement and includes a pair of opposite ends 21, 22 with a grooved slide track 23 extending between ends 21, 22.

The bearing element is precast in a normally bowed condition, shown in FIG. 6, and element 20 has a convex inner surface 24 and a concave outer surface 25 with rounded surface portions 26, 27 at respective opposite ends 21, 22. Extending outwardly at rounded surface portion 26 is a pin 32 engaged within an opening 33 in the web 34 of a channel-shaped member, e.g., 15, FIGS. 3 and 7, to mount the bearing element within the channel-shaped member between upper and lower flanges 73, 74 of the latter.

Bearing element 20 has an upper surface 28 from which ribs 29 extend upwardly and a lower surface 30 from which ribs 31 extend downwardly (FIG. 3-4 and 6).

Referring to FIGS. 2-3, 5, 7 and 8, each sliding rail element 17, 18 has a respective horizontally disposed tongue 35, 36 received within grooved slide track 23 of bearing element 20, and tongues 35, 36 slide longitudinally through grooved tracks 23, 23 during sliding movement of slidable frame 13 relative to stationary frame 11.

The bearing elements have sufficient resiliency to permit flexing between the normal, relatively bowed condition of FIG. 6 and a condition in which the bearing element is relatively less bowed, as in FIG. 7.

Referring to FIGS. 2 and 5, the distance between the outer edges 37, 38 of tongues 35, 36 is greater than the distance between the closest portions of the convex inner edges 39, 39 of grooved slide tracks 23, 23 on an opposed pair of bearing elements 20, 20, when the bearing elements are in their normal, relatively bowed condition. Accordingly, when assembled, with bearing elements 20, 20 mounted within their respective channel-shaped members 15, 16 and tongues 35, 36 engaged within grooved tracks 23, 23, as shown in FIGS. 2 and 5, the bearing elements are held in the less bowed condition of FIG. 7.

The natural resiliency of the bearing element urges it to return to its normal, more bowed condition. As a result, both opposed inner edges 39, 39 in a pair of opposed bearing elements are urged toward each other and against the outer edges 37, 38 of tongues 35, 36. This holds the entire slidable frame 13 snugly between the two opposed bearing elements 20, 20 in each pair, thereby preventing movement of slidable frame 13, relative to stationary frame 11, in a direction transverse to the direction of sliding movement, while still permitting sliding movement. The tendency of the bearing elements to return to their normal condition maintains the gripping action on the slidable frame.

During flexing of bearing element 20, because pin 32 is engaged in web opening 33 of a channel-shaped member, e.g., 15, that portion of the bearing element adjacent pin 32 and end 21 is held against substantial movement relative to the channel-shaped member; but the rest of the bearing element is permitted to so move. Rounded surface portions 26, 27 facilitate flexing of the mounted bearing element.

Changes in the extent of flexing of bearing element 20 change the extent of contact between grooved track inner edge 39 and an outer edge 37 or 38 of a sliding rail element tongue. Increased bowing decreases the extent of contact and vice versa.

Dirt may accumulate on the tongues of the sliding rail elements, and it is desirable to keep this dirt out of grooved track 23. Referring to FIGS. 3 and 4, grooved track 23 has upper and lower surfaces 40, 41, portions of which are in surface to surface contact with upper and lower surfaces 42, 43 on a tongue, e.g., 35. Grooved track 23 also has upper and lower front edges 44, 45 and upper and lower back edges 46, 47. As a tongue slides in grooved track 23, the front and back track edges (44, 45 and 46, 47) scrape dirt off portions of the tongue which move from outside track 23 into track 23. This arrangement helps keep dirt out of track 23.

Slidable frame 13 and seat 14 can be locked into a particular position relative to stationary frame 11 using latching structure illustrated in FIGS. 1, 2 and 5.

Extending between sliding rail elements 17, 18 is a member 50 (FIG. 2) on which is mounted a pivot pin 51 extending downwardly from member 50 and fixed to a plate 52 from which a handle 53 extends forwardly (FIG. 5). A spring 54 extends between handle 53 and sliding rail element 17 and normally holds handle 53 in the position shown in FIG. 5.

Depending from plate 52 are a pair of pins 55, 56 each extending through a respective slot 57, 58 in a respective latch element 59, 60. Extending outwardly from each latch element is a respective latch finger 61, 62 for engaging one of a series of respective latch openings 63, 64 spaced apart in the direction of sliding movement in channel-shaped members 15, 16 on stationary frame 11. Each latch finger extends through a respective cradle 65, 66 depending from member 50 and through an opening in the vertical portion 67, 68 of a respective slide rail 17, 18.

When latch fingers 61, 62 extend through latch openings 63, 64, slidable frame 13 and seat 14 are locked against sliding movement relative to stationary frame 11. Unlocking occurs when handle 53 is moved to the right as viewed in FIG. 1. This pivots plate 50 about the axis of pivot pin 51 and causes latch fingers 61, 62 to be retracted from latch openings 63, 64 in the stationary frame. After slidable frame 13 and seat 14 have been moved to a desired position, handle 53 is released, and spring 54 urges all the elements of the latching structure to return to latching positions.

The foregoing detailed description has been given for clearness of understanding only, and no unnecessary limitations should be understood therefrom, as modifications will be obvious to those skilled in the art.

I claim:

1. A slide mechanism comprising:
   a first frame;
   a pair of bearing elements each located on said first frame in opposed relation to each other and spaced apart in a direction transverse to the direction of desired sliding movement;
   a second frame having a pair of sliding rail elements each having means for slidably engaging a respective one of said pair of bearing elements to mount said second frame for sliding movement relative to said first frame;

at least one of said bearing elements having sufficient resiliency to permit flexing between a normal condition in which said one bearing element is relatively bowed toward said other bearing element and a condition in which the one bearing element is relatively less bowed;

and means mounting said one bearing element on said first frame in said relatively less bowed condition;

said one bearing element including means normally urging said one bearing element to return to its normal condition, whereby said second frame is held between said bearing elements in a manner which prevents movement of the second frame in a direction transverse to the direction of sliding movement.

2. A slide mechanism as recited in claim 1 wherein:

each of said bearing elements is composed of a self-lubricating, corrosion-resistant, resilient plastic material.

3. A slide mechanism comprising:
a first frame;
a pair of bearing elements each located on said first frame in opposed relation to each other and spaced apart in a direction transverse to the direction of desired sliding movement;
a second frame having a pair of sliding rail elements each having means for slidably engaging a respective one of said pair of bearing elements to mount said second frame for sliding movement relative to said first frame;
each of said sliding rail elements having upper and lower surfaces and an outer edge;
each of said bearing elements having a grooved slide track facing the other bearing element and receiving a respective one of said sliding rail elements;
said grooved slide track having upper and lower surfaces and an inner edge;
the upper and lower surfaces on said sliding rail element being in surface to surface contact with the upper and lower surfaces, respectively, on the grooved slide track within which the sliding rail element is received;
the inner edge on the grooved slide track of said one bearing element being in contact with the outer edge on the received sliding rail element;
at least one of said bearing elements having sufficient resiliency to permit flexing between a normal condition in which said one bearing element is relatively bowed towards said other bearing element and a condition in which the one bearing element is relatively less bowed;
and means mounting said one bearing element on said first frame in said relatively less bowed condition;
said one bearing element including means normally urging said one bearing element to return to its normal condition, whereby said second frame is held between said bearing elements in a manner which prevents movement of the second frame in a direction transverse to the direction of sliding movement.

4. A slide mechanism as recited in claim 3:

the other of said bearing elements having sufficient resiliency to permit flexing between a normal condition in which said other bearing element is relatively bowed toward siad one bearing element and a condition in which said other bearing element is relatively less bowed;

and means mounting said other bearing element on the first frame in said relatively less bowed condition;

said other bearing element including means normally urging the other bearing element to return to its normal condition.

5. A slide mechanism as recited in claim 3 wherein:

said means normally urging said one bearing element to return to its normal condition includes means tending to reduce the extent of said edge to edge contact between said grooved slide track and said sliding rail element.

6. A slide mechanism comprising:
a first frame having a pair of opposed frame elements, each frame element having a front surface and a rear surface;
a pair of bearing elements each located on the front surface of a respective one of said opposed first frame elements in opposed relation to each other and spaced apart in a direction transverse to the direction of desired sliding movement;
a second frame having a pair of sliding rail elements each having means for slidably engaging a respective one of said pair of bearing elements to mount said second frame of sliding movement relative to said first frame;
at least one of said bearing elements having sufficient resiliency to permit flexing between a normal condition in which said one bearing element is relatively bowed in said transverse direction and a condition in which the one bearing element is relative less bowed;
said one bearing element extending along the front surface of said first frame in the direction of sliding movement, between a pair of opposite bearing element ends;
means mounting said one bearing element on said first frame in said relatively less bowed condition, said mounting means comprising means fixing a first end portion of the one bearing element to said first frame and holding said first end portion against movement relative to the first frame during flexing of said one bearing element, the other end portion of said bearing element being in contact with said front surface of the frame in all conditions of flexing of said bearing element;
said one bearing element including means normally urging said one bearing element to return to its normal condition, whereby said second frame is held between said bearing elements in a manner which prevents movement of the second frame in a direction transverse to the direction of sliding movement.

7. A slide mechanism as recited in claim 6 wherein said mounting means for said one bearing element comprises:
a pin projecting outwardly, away from said other bearing element, at said first end portion of said one bearing element
and means on the first frame for engaging said pin.

8. A slide mechanism as recited in claim 7 wherein:

said first frame comprises a member with a cross-section having a web and a flange;
and said means for engaging said pin comprises an opening in said web.

9. A slide mechanism as recited in claim 6 wherein:

said mounting means for said one bearing element comprises means permitting movement of said one bearing element, other than said first end portion thereof, relative to said first frame during flexing of said one bearing element.

10. A slide mechanism as recited in claim 9 wherein:

said one bearing element has end portions at both ends of the bearing element in contact with said first frame;
and the second end portion, opposite said first end portion, has a rounded surface in contact with said first frame.

11. A slide mechanism as recited in claim 10 wherein:

said first end portion has a rounded surface in contact with said first frame.

* * * * *